United States Patent
Bornhoevd et al.

(10) Patent No.: US 9,547,728 B2
(45) Date of Patent: Jan. 17, 2017

(54) GRAPH TRAVERSAL OPERATOR AND EXTENSIBLE FRAMEWORK INSIDE A COLUMN STORE

(71) Applicants: Christof Bornhoevd, Palo Alto, CA (US); Marcus Paradies, Walldorf (DE); Michael Rudolf, Heidelberg (DE); Wolfgang Lehner, Dresden (DE)

(72) Inventors: Christof Bornhoevd, Palo Alto, CA (US); Marcus Paradies, Walldorf (DE); Michael Rudolf, Heidelberg (DE); Wolfgang Lehner, Dresden (DE)

(73) Assignee: SAP AG, Walldorf (DE)

( * ) Notice: Subject to any disclaimer, the term of this patent is extended or adjusted under 35 U.S.C. 154(b) by 325 days.

(21) Appl. No.: 14/308,154

(22) Filed: Jun. 18, 2014

(65) Prior Publication Data
US 2015/0370919 A1 Dec. 24, 2015

(51) Int. Cl.
*G06F 17/30* (2006.01)

(52) U.S. Cl.
CPC ... *G06F 17/30958* (2013.01); *G06F 17/30315* (2013.01); *G06F 17/30386* (2013.01)

(58) Field of Classification Search
CPC .......... G06F 17/30958; G06F 17/30442; G06F 17/30286; G06F 17/30451; G06F 17/30315; G06F 17/30386
USPC ............ 707/798, 603, 717, 737, 769, 705
See application file for complete search history.

(56) References Cited

U.S. PATENT DOCUMENTS

| | | | | |
|---|---|---|---|---|
| 8,433,701 | B2 * | 4/2013 | Sargeant | G06F 17/30451 707/714 |
| 8,971,665 | B2 * | 3/2015 | Zhang | 382/286 |
| 8,977,650 | B2 * | 3/2015 | Duan | G06F 17/30292 707/798 |
| 9,087,361 | B2 * | 7/2015 | Mirra | G06Q 40/00 |
| 9,195,941 | B2 * | 11/2015 | Mojsilovic | G06Q 10/00 |
| 2014/0136555 | A1 * | 5/2014 | Jacob | G06F 17/30958 707/754 |
| 2015/0106223 | A1 * | 4/2015 | Zhou | G06Q 30/0282 705/26.7 |
| 2015/0169758 | A1 * | 6/2015 | Assom | G06F 17/30731 707/603 |

* cited by examiner

*Primary Examiner* — Dangelino Gortayo
(74) *Attorney, Agent, or Firm* — Sterne, Kessler, Goldstein & Fox P.L.L.C.

(57) ABSTRACT

A system, computer-implemented method, and a computer-readable storage medium for a traversal of a property graph, are provided. The edge table of the property graph is divided into a plurality of fragments. A first fragment is selected for traversal using a set of selected vertices, where the traversal identifies a set of edges. Based on the set of edges, a set of adjacent vertices is determined during the traversal. A set of discovered vertices in the property graph is determined based on the set of selected vertices and the set of adjacent vertices.

19 Claims, 10 Drawing Sheets

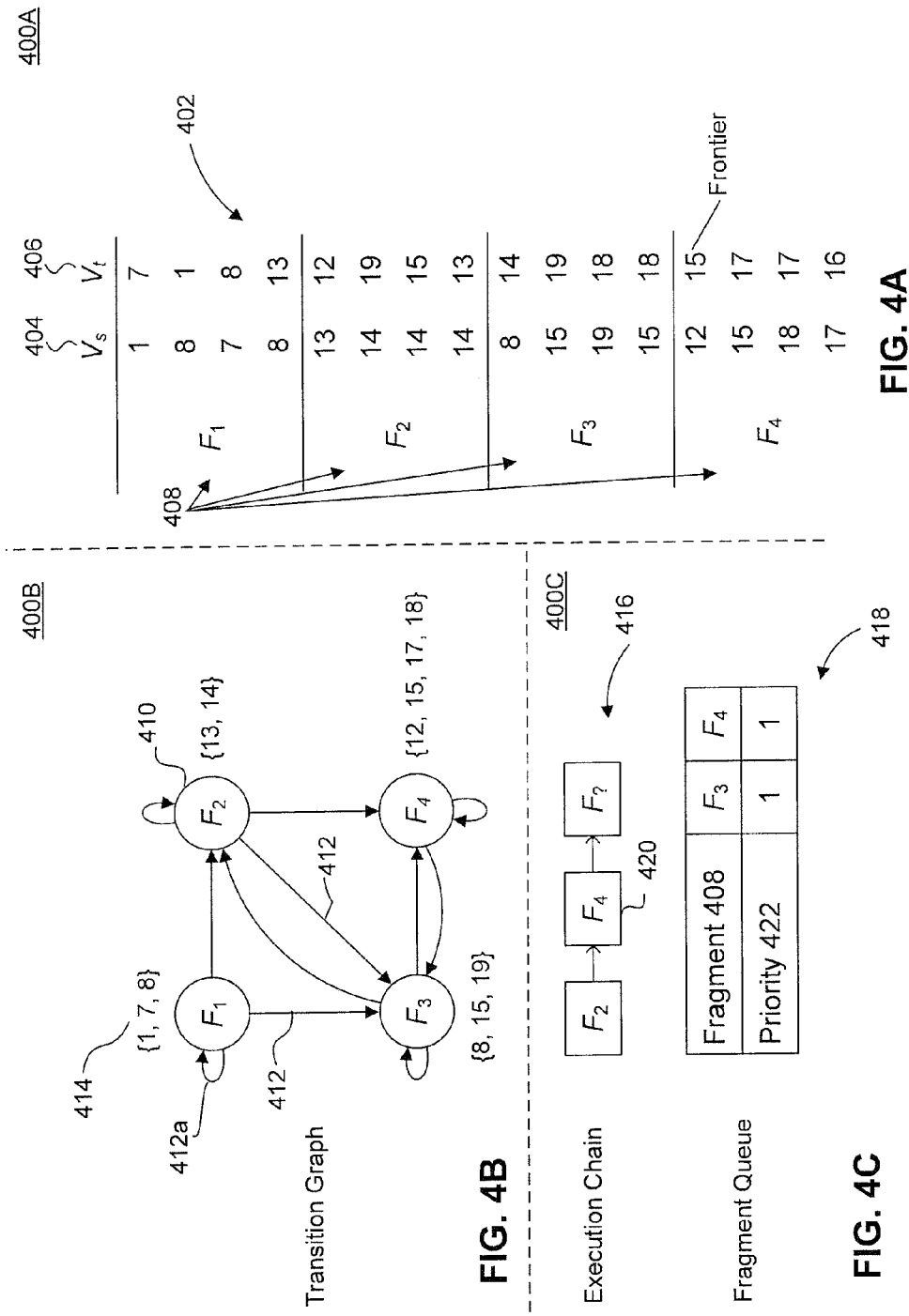

Algorithm 2: FI-traversal

Input : Traversal configuration $\kappa = (S, E_a, c, r, d)$.  ~ 502
Output: Set of discovered vertices $R$.

1  begin
2     if $d$ *is backward* then
3        $\text{swap}(V_s, V_t)$; // Adjust Column Handles
4     $D_w[0] \leftarrow S$;
5     $Frontiers \leftarrow S$;
6     $sFactor \leftarrow 1$;
7     $mFactor \leftarrow 1$;
8     while $\text{getNextFragment}(Frontiers, F)$ do
9        $V_s.\text{nWayScan}(F, D_w, E_a, sFactor, P)$;
10       $V_t.\text{nWayMaterialize}(P, mFactor, D_w, Frontiers)$; if $sFactor \leq r$ then ++$sFactor$;
11       if $mFactor < r$ then ++$mFactor$;
12    $R \leftarrow \text{generateResult}(c, r, D_w)$;

Algorithm 3: Procedure getNextFragment(Frontiers, F)

Input : Set of frontier vertices Frontiers.
Output: Candidate fragment F to read next.

1  begin
2    $F_{last} \leftarrow$ m_chain.getLast().
3    foreach outgoing edge $e = (F_{last}, F_{cand})$ from F do
4      foreach $v \in F$ do
5        if $F_{cand}$.matches$(v) \wedge \neg l$.hasKey$(F_{cand}, v)$ then
6          $l$.insert$(F_{cand}, v)$;
7          if PQ.haskey$(F_{cand})$ then
8            PQ.increasePrio$(F_{cand})$
9          else PQ.insert$(F)$;

10   if $\neg$PQ.empty() then
11     $F \leftarrow$ PQ.extractMin();
12     m_chain.add$(F)$;
13     return true;
14   else return false;

FIG. 6

| $V_s$ | $V_t$ | Type |
|---|---|---|
| D | F | a |
| A | D | a |
| A | B | a |
| A | C | a |
| E | B | a |
| E | G | a |
| D | B | b |
| B | E | b |
| F | G | b |

- - - - Type Clustering

- - - - Edge Clustering

FIG. 9

GRAPH TRAVERSAL OPERATOR AND EXTENSIBLE FRAMEWORK INSIDE A COLUMN STORE

BACKGROUND

Background Art

Generally, a data graph represents data from multiple domains in an expressive and flexible way. For example, a data graph can show relationships between different data objects, and relationships between data objects and properties of these objects. These relationships may be mapped to vertices and edges in the data graph.

The advances in the memory-centric data management system that leverage the capabilities of modern hardware, vast memory space, multi-core CPU (central processing unit) and GPU (graphics processing unit) processors provide means for data graph processing as part of a database management systems.

BRIEF DESCRIPTION OF THE DRAWINGS

The accompanying drawings are incorporated herein and form a part of the specification.

FIG. 4A is an example diagram of a portion of an edge table utilized by a fragmented incremental traversal algorithm, according to an embodiment.

FIG. 4B is a diagram of an example transition graph index for an edge table, according to an embodiment.

FIG. 4C is a block diagram of example data structures that store query specific information, according to an embodiment.

FIG. 5 is example pseudo code for a fragmented incremental traversal algorithm, according to an embodiment.

FIG. 6 is example pseudo code for retrieving a next fragment for a traversal using the fragmented incremental traversal algorithm, according to an embodiment.

FIG. 9 is a block diagram of an example clustered edge table, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for traversing a column based storage in a database management system.

Figure 1:
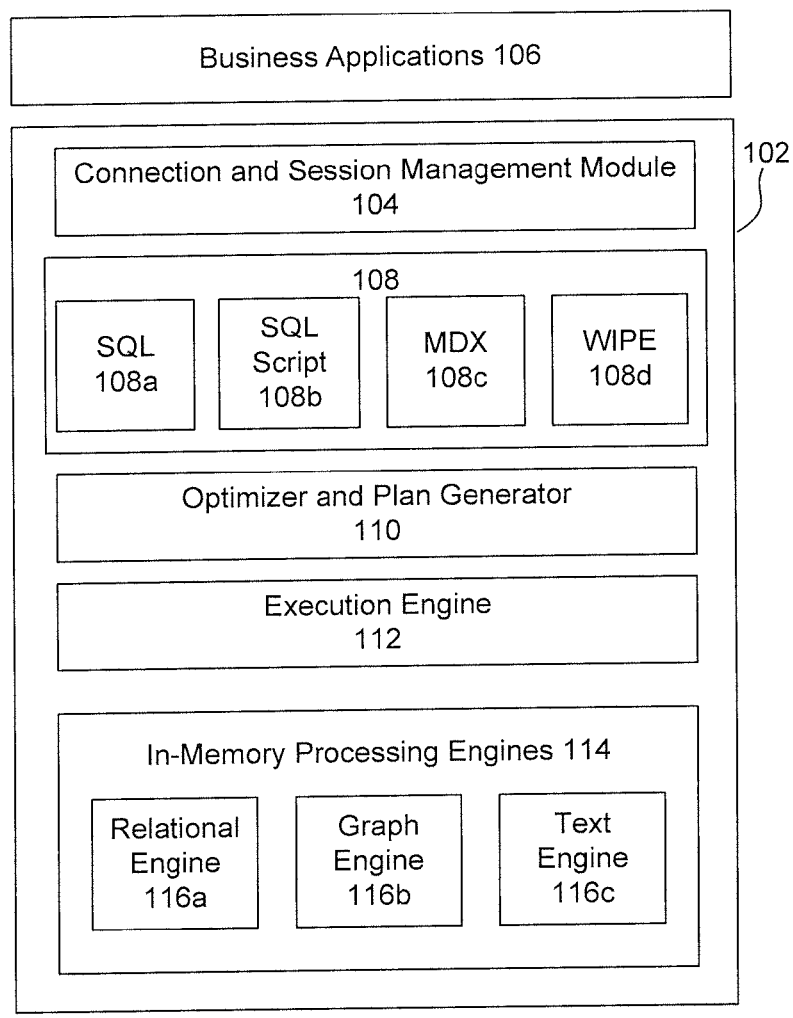
FIG. 1 is a block diagram of a database management system, according to an embodiment.

FIG. 1 is a block diagram 100 of a database management system, according to an embodiment. Database management system 102 may be a memory-centric data management system that leverages hardware capabilities, such as, but not limited to vast main memory space, multi core CPUs and GPU processors, and solid state drive (SSD) storage.

In an embodiment, database management system 102 includes connection and session management module 104. Connection and session management module 104 creates and manages sessions and connections for database clients. Database clients may be computing devices under a control of a user (also referred to as client devices) that access and/or execute business applications 106. Business applications 106 are custom or generic applications that include applications related to social media, bio-informatics, and business processing, to name a few examples. Connection and session management module 104 also receives different queries, including graph queries, that database clients issue to database management system 102 and transmits the results of the queries back to the database clients.

Once connection and session management module 104 establishes a session, database clients may use database languages 108, to manipulate data associated with business applications 106. Example database languages 108 include structured query language (SQL) 108a, SQL Script 108b (a scripting language for describing application specific calculations inside the database), a MultiDimensional eXpressions (MDX) 108c, and WIPE (for data graph processing) 108d, to give a few examples.

In an embodiment, optimizer and plan generator 112 parses and optimizes client requests that, for example, may be made using database languages 108. For example, optimizer and plan generator 110 may generate an execution plan for executing a client request in database management system 102. Once generated, optimizer and plan generator 110 passes the execution plan to execution engine 112.

In an embodiment, execution engine 112 invokes an in-memory processing engine 116 to process the execution plan. Execution engine 112 may invoke a different in-memory processing engine 114 based on the execution plan type. Example in-memory processing engines 116 include a relational engine 116a, a graph engine 116b and a text engine 116c.

In an embodiment, relational engine 116a processes structured data. Relational engine 116 supports both row- and column-oriented physical representations of relational tables. In an embodiment, column-oriented data is stored in a highly compressed format in order to improve the efficiency of memory resource usage and to speed up the data transfer from disk storage to cache memory or from cache memory to CPU.

In an embodiment, graph engine 116b and text engine 116c support efficient representation and processing of unstructured data. For example, graph engine 116b processes data graphs. To enable efficient graph access and processing, graph engine 116b provides a set of base operations that act upon a graph. In an embodiment, these operations may be invoked using WIPE 108d, a graph query manipulation language.

In an embodiment, text engine 116c provides text indexing and search capabilities. Example text indexing and search capabilities include search for words and phrases, fuzzy search (which tolerates typing errors), and linguistic search (which finds variations of words based on linguistic rules). In addition, text engine 116c ranks search results and supports searching across multiple tables and views.

As discussed above, database management system 102 includes graph engine 116b. Graph engine 116b processes data stored in a form of a data graph. To process a data graph, graph engine 116b includes an internal graph application program interface (API) that provides a set of core operators. The core operators are the building blocks for graph data query and manipulation language, such as, but not limited to WIPE. Also, the core operators may be leveraged to implement higher level graph processing algorithms, such as shortest path, nearest neighbor, minimum spanning tree, maximum flow, or transitive closure calculations, to name a few examples.

In database management system 102, a data graph may be represented as a property graph. A property graph is a directed graph where vertices and edges have attributes. Attributes on vertices and edges can be understood as name-value pairs. In one embodiment, a vertex attribute may include a unique identifier, and an edge attribute may represent a semantic type of a connection.

In an embodiment, database management system 102 stores property graphs as adjacency lists in the form of columns of data. Those columns of data may be stored as separate sections of data, rather than consecutive rows that are common in a conventional relational database systems.

Figure 2:
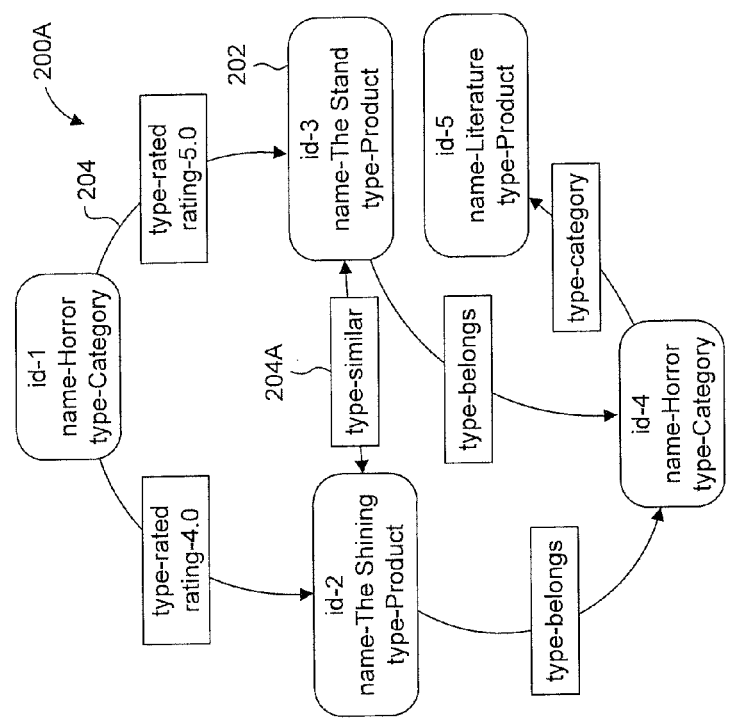
FIG. 2A is an example property graph, according to an embodiment.
FIG. 2B is a column-based representation of vertex table of an example property graph, according to an embodiment.
FIG. 2C is a column-based representation of an edge table of an example property graph, according to an embodiment.

FIG. 2A is an example property graph 200A, according to an embodiment. Property graph 200A includes vertices 202 and edges 204. In property graph 200A there are five exemplary vertices 202 and six exemplary edges 204. Each vertex 202 has exemplary attributes including "id", "name" and "type", that may or may not be associated with values. In an embodiment, an "id" property may be the only required attribute for vertices 202. Each edge has exemplary attribute "type" and "rating" that may or may not be associated with values. A person skilled in the art will appreciate that property graph 200A that includes above attributes for vertices 202 and edges 204 is exemplary, and that there maybe be other types of property graphs that include other types of attributes.

In an embodiment, vertices 202 and edges 204 of property graph 200A may be stored in column-oriented, relationship tables, shown in FIGS. 2B and 2C. For example, FIG. 2B is an example column-based representation of a vertex table 200B of a property graph, according to an embodiment. For demonstrative purposes only, vertex table 200B represents vertices in property graph 200A, but may also represent vertex tables for other property graphs. Each vertex in vertex table 200B is mapped to a single database record, and each vertex attribute is mapped to a separate column. For example, attributes "id," "name," and "type" are mapped to different columns. In an embodiment, attribute "id" is a unique identifier that identifies each vertex (also referred to as a vertex ID), as shown in a vertex identifier column 206. Exemplary vertex IDs 1-5 in vertex identifier column 206 identify the five exemplary vertices in a property graph 200A. In an embodiment, the unique identifier is the only mandatory attribute in vertex table 200B.

In an embodiment, edges 204 are stored in an edge table. For example, FIG. 2C is an example column based representation of an edge table 200C in a property graph, according to an embodiment. For demonstrative purposes only, edge table 200C represents edges in property graph 200A. Each edge 204 in edge table 200C is mapped to a single database record. Moreover, edge 204 in the property graph is uniquely identified by the composite key that includes a source vertex, a target vertex, and an edge type. In an embodiment, edge table 200C includes a source vertex column $V_s$, such as $V_s$ column 208, and a target vertex column $V_t$, such as $V_t$ column 210. $V_s$ column 208 includes a set of vertices that originate edges 204 in property graph 200A. $V_t$ column 210 includes a set of vertex IDs that are a destination of edges 204 in property graph 200A.

In an embodiment, property graph 200A may include a bi-directional edge, such as edge 204A. In a bi-directional edge 204A both source vertex and target vertex act as a source and target vertices. In an embodiment, bi-directional edge 204A may be represented as two distinct edges in edge table 200C where each edge indicates a direction from a source vertex to a target vertex (not shown).

In an embodiment, one of the core operators is a graph traversal operator (also referred to as a GTO). The GTO efficiently traverses a property graph, in response to a query issued, for example, by a client device. The GTO includes an IO (input/output) interface. The input interface receives parameters for input. These input parameters may include a set of start vertices and a traversal description, in one embodiment. Input parameters may be received from a client device or other processors in database management system 102 as part of a query. In a different implementation, input parameters may be derived from a query.

As GTO traverses a property graph, GTO may generate a set of discovered vertices R, as output. The set of discovered vertices R may be returned to a client device or further used within database management system 102 as input to another operation.

In one embodiment, a property graph, such as an exemplary graph 200A, may be defined as property graph G=(V, E), where V is a set of vertices and E is a set of edges. In an embodiment, E may be defined as $E \subseteq (V \times V)$. In a further embodiment, input parameters for a graph traversal may be represented as a traversal configuration ρ that is defined as ρ=(S, ϕ, c, r, d), that includes a set of start vertices S such that $S \subseteq V$, an edge predicate ϕ, a collection boundary c, a recursion boundary r, and a traversal direction d. In an embodiment, the output of a GTO may return a set of visited vertices R, where $R \subseteq V$.

In an embodiment a graph traversal operation ($\tau_G$) is a unary operation on a property graph.

In an embodiment, an edge predicate ϕ defines a propositional formula consisting of atomic attribute predicates that can be combined with logical operators, such as a logical conjunction (∧), logical disjunction (∨), and logical not (⌐). The logical operators are known to a person of ordinary skill in the art.

In an embodiment, a GTO uses a graph traversal algorithm to evaluate an edge predicate ϕ to determine a set of relevant edges $E_a$. Example evaluation includes GTO evaluating the edge predicate ϕ for each edge e∈E and appending the edges from the evaluation to a working set of relevant edges $E_a$. Relevant edges are edges that GTO uses during a graph traversal to traverse between source and target vertices.

In an embodiment, a recursion boundary r∈N$^+$ defines a maximum number of levels that GTO may traverse, where N may be a positive integer. In a further embodiment the recursion boundary may be infinite (∞).

In an embodiment, a collection boundary c∈N specifies a traversal level from where GTO starts collecting traversal vertices. In a further embodiment, during a traversal GTO may enforce a condition c≤r to determine a set of discovered vertices R. GTO then generates an output that includes a set of vertices R that have been visited in the boundaries defined by c and r.

In an embodiment, a traversal direction $d \in \{\rightarrow, \leftarrow\}$ specifies a direction to traverse edges E. For example, a forward direction $d=\rightarrow$ traverses edges from the source vertex to the target vertex, and a backward direction $d=\leftarrow$ traverses edges from the target vertex to the source vertex.

When a GTO traverses a property graph, a traversal may be defined by an ordered set of paths P, where each path describes a transition between two traversal iterations. In an embodiment, path steps may be evaluated sequentially according to the total ordering in the set of paths P.

In an embodiment, a GTO may determine a number of steps in a path using a recursion boundary r. In an embodiment, at each path step $p_i \in P$ with $1 \le i \le r$, GTO receives a set of discovered vertices $D_{i-1}$ at level i−1 and returns a set of adjacent vertices $D_i$.

In an embodiment, when GTO receives a set of start vertices S, GTO may assign the vertices in set S to a set of discovered vertices $D_o$.

In an embodiment, GTO includes transformation rules for paths $p_i$. For example, in a forward direction d, the transformation rule may be:

$$D_i = \{v | \exists u \in D_{i-1} : e=(u, v) \in E \wedge eval(e, \phi);$$

and in a reverse direction d, the transformation rule may be $$D_i = \{u | \exists v \in D_{i-1} : e=(u, v) \in E \wedge eval(e, \phi);$$

In an embodiment, in traversing path step $p_i$, GTO generates a set of discovered vertices $D_i$ by traversing from each vertex in $D_{i-1}$ over outgoing (in forward traversal) or incoming (in backward traversal) edges that match edge predicate $\phi$ (the relevant edges $E_a$). Once GTO completes the traversal of path step $p_i$, GTO generates a set of discovered vertices $D_i$ that contains vertices reachable within one or more hop(s) from vertices $D_{i-1}$ via edges that satisfy edge predicate $\phi$.

In an embodiment, once GTO completes traversing a property graph, GTO generates a set of discovered vertices R for a traversal operation "$\tau$". In an embodiment, the set of discovered vertices R may be represented as:

$$R_\tau = (\underbrace{\bigcup_{t=c}^{r} D_t}_{\text{target vertices}}) \setminus (\underbrace{\bigcup_{t=0}^{c-1} D_t}_{\text{visited vertices}})$$

In an embodiment, a collection boundary c and a recursion boundary r divides the discovered set of vertices into two working sets. The first set of working vertices contains visited vertices. Visited vertices may include all vertices that have been discovered before the GTO traversal reaches collection boundary c. In an embodiment, the set of visited vertices D may be produced by forming a union of vertex sets $\{D_0, D_1, \ldots, D_{c-1}\}$ from paths $p_1$ to $p_{c-1}$.

The second set of working vertices contains targeted vertices. Target vertices are vertices that may be relevant for a set of discovered vertices R that is generated as output of the traversal. In an embodiment, GTO generates target vertices by taking a union of vertex sets $\{D_c, \ldots, D_r\}$ from paths $p_c$ to $p_r$.

In an embodiment, GTO generates a set of discovered vertices R by taking a compliment between the set of targeted vertices and the set of visited vertices. GTO may then consider vertices that are in the set of targeted vertices, but not in the set of visited vertices as part of the set of discovered vertices R.

Figure 3:
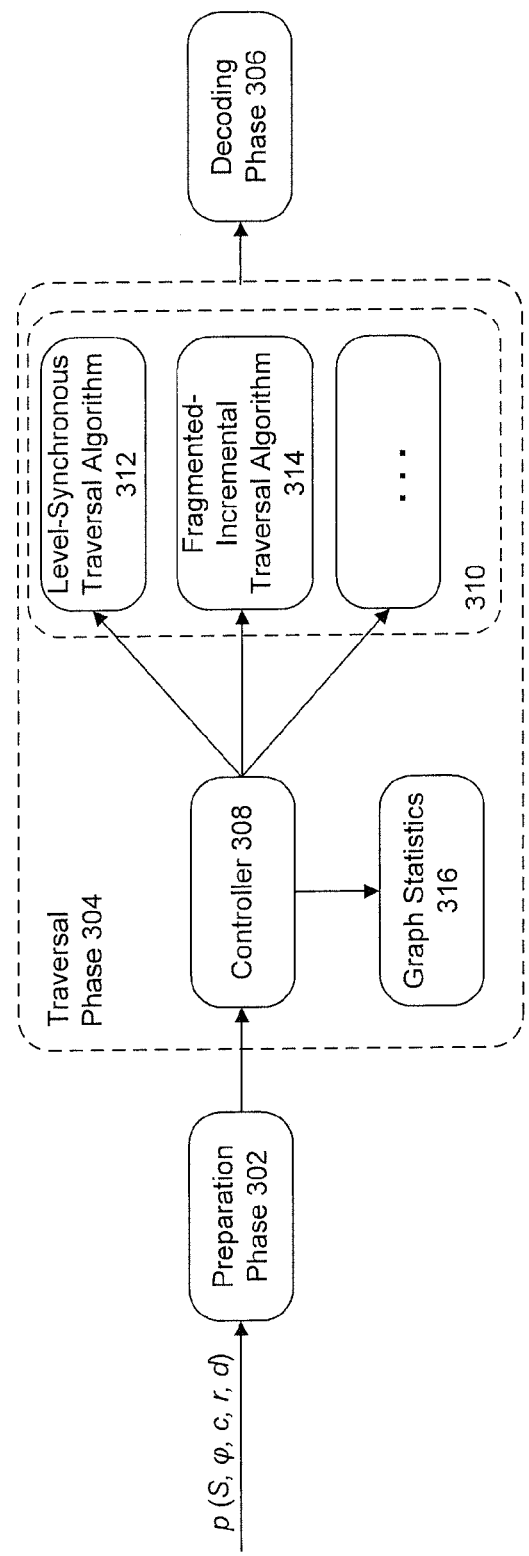
FIG. 3 is a block diagram of a framework that utilizes a graph traversal operator, according to an embodiment.

In an embodiment, a GTO may be implemented within a framework included in graph engine 116b. FIG. 3 is a block diagram 300 of an example framework that utilizes a graph traversal operator, according to an embodiment. In an embodiment, the framework allows graph engine 116b to select an algorithm from a set of algorithms to processes a property graph with a GTO, where the algorithm may be selected based on statistics of the property graph. Example framework in block diagram 300 may be divided into three phases: preparation phase 302, traversal phase 304 and decoding phase 306.

In preparation phase 302, graph engine 116b receives a set of start vertices S. In an embodiment, graph engine 116b may transform the set of start vertices S into a processing friendly set-oriented data structure. For example, vertices in a property graph may be encoded in a binary, or another type of encoding, such that the values of vertex IDs V in a property graph are the same length in a computing system. In an embodiment, the graph engine 116b may use a dictionary to encode values of vertices V in a property graph to and from an encoded form. Once graph engine 116b receives the set of start vertices S, graph engine 116 may use a dictionary to encode the set of start vertices S into a representation consisted with property graph G.

In an embodiment, in preparation phase 302, graph engine 116 also selects a vertex ID column. In an embodiment, a vertex ID column may be $V_s$ column 208 or $V_t$ column 210, depending on the traversal direction d specified in the input parameters.

In an embodiment, in preparation phase 302, graph engine 116 also selects a set of relevant edges $E_a$. Relevant edges $E_a$ are edges in a property graph that GTO may consider during the graph traversal. As discussed above, GTO may identify a set of relevant edges $E_a$ through an edge predicate $\phi$. Identifying the set of relevant edges $E_a$ may reduce the number of traversals that GTO makes during a traversal operation. In an embodiment, a set of relevant edges $E_a$ may be stored in a list that represents valid and invalid records in a column store table, such as edge table 200C.

In an embodiment, in a traversal phase 304, a GTO traverses property graph G and determines a set of discovered vertices R. As part of traversal phase 304, graph engine 116b includes a controller 308. Controller 308 selects a graph traversal algorithm, from a set of the graph traversal algorithms 310 that GTO may use to traverse property graph G. Set of graph traversal algorithms 310 may be stored in a memory accessible to graph engine 116b, such as one of the memories described in FIG. 10. Example graph traversal algorithms may include a level-synchronous traversal algorithm 312 and a fragmented incremental traversal algorithm 314 (also referred to as FI traversal 314), discussed below.

In an embodiment, GTO may use different algorithms from a set of graph traversal algorithms 310 to improve or optimize graph traversal, as different types of algorithms may be suited for different property graphs topologies. To select a traversal algorithm for GTO, controller 308 may use data statistics 316. Data statistics 316 may be statistics on the characteristics of a property graph, that include the depth of the graph, number of vertices, how vertices are connected by the edges, what is an average number of neighbors of a vertex, the length of an average path, how many vertices are strongly connected to other vertices, etc. In an embodiment, controller 308 may collect graph statistics at predetermined time intervals, at predetermined times or when characteristics (vertices, edges, etc.) of property graph change in database management system 102.

In a further embodiment, controller 308 uses characteristics of a submitted query along together with data statistics 316 of a property graph to determine a traversal algorithm for GTO.

Once controller 308 selects a traversal algorithm, GTO uses input parameters, such as, collection boundary c, a recursion boundary r, a traversal direction d, a set of relevant edges $E_a$, and a set of start vertices S to determine a set of discovered vertices R in a property graph.

In an embodiment, a set of discovered vertices R may be in an encoded format. To decode the set of discovered vertices R, graph engine 116b translates the set of discovered vertices R from the encoded format to the format consistent with the query in a decoding phase 306. For example, graph engine 116b queries a graph dictionary to translate the set of discovered vertices R from the encoded format. In an embodiment, this process is the reverse of the encoding process that graph engine 116b performs during preparation phase 302. In an embodiments where decoding is not necessary, graph engine 116b may skip decoding phase 306 altogether and transmit the set of discovered vertices R to a source issuing a query.

In an embodiment, level-synchronous traversal algorithm 312 (also referred to as LS traversal 312) may operate on $V_s$ column 208 and $V_t$ column 210 that represent source and target vertices of edges 204. In an embodiment, when GTO uses LS traversal 312, GTO exploits thread level parallelization. To exploit thread-level parallelization, GTO uses LS traversal 312 to divide $V_s$ column 208 and $V_t$ column 210 into n logical partitions of edges, where n is a positive integer. Once divided, distinct threads process a partition in parallel.

For example, in LS traversal 312 two threads may process each partition, such as but not limited to a scan worker thread and a materialization thread. In an embodiment, the scan worker thread for a partition receives a search request for a set of vertices and searches for vertices from the set in $V_s$ column 208 within the partition. Because each scan worker thread scans an individual partition, n scan worker threads may operate in parallel. When a scan worker thread completes a scan of a partition, the scan worker thread generates a local position list p for the partition that includes the vertices found during the scan in $V_s$ column 208.

In an embodiment, the scan worker thread passes the local position list p to a materialization worker thread. The materialization worker thread processes the local position list p within the partition. For example, the materialization worker thread retrieves vertices adjacent to vertices in the local position list p from $V_t$ column 210. Because each materialization worker thread works within an individual partition, materialization worker thread may operate in parallel with scan worker threads or materialization worker threads from other partitions.

In an embodiment, once a materialization worker thread completes processing the associated partition, LS traversal 312 combines vertices from $V_t$ column 210 that materialization worker thread located into a set of discovered vertices R. In an embodiment, set of discovered vertices R includes vertices from all partitions.

In an embodiment, if there are other partitions that require traversing, LS traversal 312 initializes scan worker thread and materialization worker thread to these partitions. LS traversal 312 may determine that all partitions were processed when LS traversal 312 reaches a recursion boundary r. Once all partitions may have been processed, LS traversal 312 returns a set of discovered vertices R.

FIGS. 4A-C, 5-8 are diagrams, algorithms, and flowcharts 400A-C, 500-800 that describe fragmented incremental traversal algorithm 314 or FI traversal 314. In an embodiment, FI traversal 314 divides an edge table into fragments. Once divided, FI traversal 314 limits a number of read operations to data records in a property graph to fragments that are required for creating a set of discovered vertices R. FIG. 4A is a diagram 400A of a portion of an edge table utilized by a fragmented incremental traversal algorithm, according to an embodiment. In diagram 400A, a displayed portion of edge table 402 includes a source vertex column 404 and a target vertex column 406. Source vertex column 404 and target vertex column 406 are further divided into fragments, collectively referred to as fragments 408, such as fragments $F_1$, $F_2$, $F_3$ and $F_4$. In an embodiment, source vertex column 404 and target vertex column 406 may be divided into fragments 408 according to fragment size, according to edge type, or according to vertex identifiers, to name a few examples.

In a multi-threaded environment, GTO performs multiple scans within each fragment 408 in parallel. Once GTO completes traversing one fragment 408, such as fragment $F_1$, GTO determines the next fragment 408 in edge graph 402 that can be traversed. In an embodiment, GTO determines a next fragment 408 to traverse based on a transition graph index (TGI) 400B.

FIG. 4B is a graph 400B of an example transition graph index for an edge table, according to an embodiment. For exemplary purposes, graph 400B is a graph of a TGI for edge table 402. In an embodiment, graph 400B may be modeled as a directed graph, where vertices 410 are fragments 408 and edges 412 are transitions between vertices 410. In an embodiment, a transition between fragments 408, such as fragments $F_1$ and $F_2$ describes a path of length=2 with edge $e_1=(u, v)$ in fragment $F_1$ and an edge $e_2=(v, w)$ in fragment $F_2$. For example, as shown in edge table 402 and graph 400B, fragment transition $F_2 \rightarrow F_4$ has a path from vertex 13 to vertex 12 and to vertex 15. This path may be represented as edge $e_1=(13, 12)$ in $F_2$ and edge $e_2=(12, 15)$ in $F_4$.

In an embodiment, when GTO reads edge $e_1$ in fragment $F_1$ during the traversal, GTO may also read fragment $F_2$ because fragment $F_2$ includes edges that extend the traversal path of $F_1$. In a further embodiment, each fragment 408 has at most one fragment transition to another fragment 408. In a further embodiment, the fragment transition may also be a transition from fragment 408, such as fragment $F_1$ to itself as shown by edge 412a.

In an embodiment, graph 400B also includes a fragment synopsis 414. Fragment synopsis 414 represents distinct values, such as distinct vertex IDs of source vertices that are included in each fragment 408. For example, a fragment synopsis for fragment F1 includes vertices {1, 7, 8}, and a fragment synopsis for fragment F2 includes vertices {13, 14}. In a further embodiment, each fragment synopsis 414 may be stored in a bit data structure where bits are set to distinct values present in each fragment 408.

In an embodiment, FI traversal 314 also includes data structures that store query-specific runtime information. FIG. 4C is a block diagram 400C of data structures that store query specific information, according to an embodiment. These data structures may be stored in system memory, such as, one of memories discussed in FIG. 10. Example data structures include an execution chain 416 and a fragment queue 418.

In an embodiment, execution chain 416 may be a list, queue, array, or another data structure known to a person of ordinary skill in the art. Execution chain 416 stores fragments 408 that GTO previously traversed. When GTO traverses another fragment 408, GTO appends, inserts, or otherwise adds the traversed fragment 408 into execution chain 418. In example, in diagram 400C execution chain 416 stores fragments $F_2$ and $F_4$. In an embodiment, block "F?" in execution chain 416 indicates that the block is reserved for the next fragment 408 that GTO will traverse.

In an embodiment, fragment queue 418 may be a list, queue, array, or another data structure known to a person of ordinary skill in the art. Fragment queue 418 may store fragment candidates that may be selected by GTO for traversing, after GTO completes traversing fragment 408.

In an embodiment, fragment queue 418 may be a priority-based fragment queue. In a priority-based fragment queue, GTO may select the order of fragment candidates that will be traversed based on priority 422 associated with each fragment 408. One example way to select a next fragment candidate, is for GTO to select a tail fragment 420 in execution chain 416. In an embodiment, tail fragment 420 is fragment 408 that GTO has just completed traversing. Once selected, GTO may use a set of newly discovered vertices (also referred to as "frontier vertices") associated with tail fragment 420 to determine the next fragment candidate to traverse. In an embodiment, GTO probes each fragment synopses 414 of fragment candidates that are adjacent to tail fragment 420 with frontier vertices to determine if frontier vertices are present in the adjacent fragment candidates. If GTO matches a vertex in fragment synopses 414 of an adjacent fragment candidate with one of the frontier vertices, GTO may add the fragment candidate associated with the adjacent fragment synopses 414 to fragment queue 418. If the fragment candidate with a matched fragment synopses 414 is already in fragment queue 418, GTO may increase priority 422 associated with fragment candidate in fragment queue 418. When GTO completes traversing frontier vertices and updating fragment queue 418, GTO selects fragment candidate from fragment queue 418 with the highest priority as fragment 408 that requires traversal.

For example, suppose GTO traverses vertex with ID=13 in fragment $F_2$, as shown in edge table 402. As GTO traverses a vertex with ID=13, GTO discovers vertex with ID=12, which becomes a frontier vertex. To select the next fragment 408, GTO probes fragment synopsis 414 of each adjacent fragment of fragment $F_2$ (fragments $F_2$, $F_3$ and $F_4$ as shown in graph 400B) with the frontier vertex with ID=12. Since fragment $F_4$ includes vertex with ID=12, GTO increments priority of fragment $F_4$ from 1 to 2 (not shown). If fragment $F_4$ has the highest priority, GTO selects fragment $F_4$ as the next fragment to traverse.

In an embodiment, after GTO completes processing fragment $F_4$, GTO discovers vertex with ID=15. GTO then probes fragments $F_3$ and $F_4$ in fragment queue 418 as potential candidates for being traversed next (not shown), and selects the fragment with the highest priority 422. In an embodiment, where fragment queue 418 includes multiple fragments 408 with equal priority, GTO may select either fragment.

In an embodiment, where tail fragment 420 does not have frontier vertices, GTO selects fragment 408 from fragment queue 418 with a highest priority.

In an embodiment, when fragment queue 418 becomes empty and does not include fragments 408, GTO completes FI traversal 314 and returns a set of discovered vertices R.

FIG. 5 is example pseudo code 500 for a fragment incremental traversal algorithm, according to an embodiment. As discussed above, in an embodiment, input parameters to FI traversal 314 may be a traversal configuration that includes a set of start vertices S, an edge set $E_a$, a collection boundary c, a recursion boundary r, and a traversal direction d. As shown in lines 2-3 of pseudo code 500, when direction d is backward, GTO may invoke function "swap $(V_s, V_t)$" that swaps the source vertex column 404 with a target vertex column 406 and facilitates a backward traversal, in an embodiment.

In an embodiment, output of FI traversal 314 may be a set of discovered vertices R. As discusses above, the set of discovered vertices R may include visited vertices that GTO discovered between a collection boundary c and a recursion boundary r.

In an embodiment, GTO using FI traversal 314 executes series of iterations on fragment 408. In a further embodiment, traversals within fragment 408 may be performed in parallel, using parallel computing threads. Computing threads executing in parallel are known to a person of ordinary skill in the art.

In an embodiment, FI traversal 314 may use function getNextFragment (Frontiers, F) to retrieve next fragment 408 that requires traversing, as shown on line 8 of pseudo code 500. The details of the getNextFragment (Frontiers, F) are discussed below with reference to FIG. 6. The input parameter to getNextFragment (Frontiers, F) is a set of frontier vertices (referred to as "Frontiers"). In an embodiment, an initial set of frontier vertices may be a set of start vertices S as shown in pseudo code 500 at line 5. Subsequently a set of frontier vertices are vertices that were discovered when GTO traversed the last fragment 408. The output of getNextFragment (Frontiers, F) is a next fragment candidate (F) for GTO to traverse using FI traversal 314. In an embodiment, each fragment 408 includes the start and end positions in source vertex column 404 that identify the boundaries of each fragment 408.

In an embodiment, for fragment 408 identified using getNextFragment (Frontiers, F) function, GTO uses FI traversal 314 to perform a fragment scan at line 9 of pseudo code 500. During the scan, FI traversal 314 takes an sFactor number (where sFactor may be an integer) of working sets of vertices $D_w$ (sets of visited vertices) from the traversal iterations and returns matching edges in the corresponding position lists as a vector of position lists P. For example, when sFactor=2 the scan probes the column with two vertex sets from two different traversal iterations, and returns matching edges into two position lists, P1 and P2 in the vector of position lists P.

In an embodiment, once FI traversal 314 identifies the matching edges in the vector of position lists P, FI traversal 314 uses the matching edges to determine the adjacent vertices, as shown at line 10 of pseudo code 500. For example, depending on a value of an mFactor number (where mFactor may be an integer), FI traversal 314 reads the values of matching edges and identifies adjacent vertices in target vertex column 406, that may be mFactor levels away. FI traversal 314 then adds the identified vertices to a list of the working set of vertices $D_w$ as the newly discovered vertices.

In an embodiment, FI traversal 314 also adds the newly discovered vertices to the set of frontier vertices, so that FI traversal 314 can then select the next fragment candidate to traverse.

In an embodiment, once GTO reaches a recursion boundary r, FI traversal 314 reads and processes remaining fragments 408 from fragment queue 418.

In an embodiment, FI traversal 314 terminates when getNextFragment (Frontiers, F) function does not return additional fragment candidates for GTO to traverse. Once traversal terminates at line 8, FI traversal 314 generates a set of discovered vertices R that is constrained by a recursion boundary r and a collection boundary c.

FIG. 6 is example pseudo code 600 for retrieving a next fragment for traversal using the fragment incremental traversal algorithm, according to an embodiment. For example, psuedo code 500 calls the getNextFragment (Frontiers, F) function at line 8, that may invoke pseudo code 600. As discussed above, getNextFragment (Frontiers, F) function receives a set of frontier vertices (Frontiers) that includes vertices discovered during the last traversal and uses the set of frontier vertices to return a next fragment candidate (F) for traversing using GTO.

In an embodiment, at line 2 in pseudo code 600, FI traversal 314 identifies a last processed fragment 420 in execution chain 416. Once FI traversal 314 identifies last processed fragment 420, FI traversal 314 probes fragment synopsis 414 of fragment candidates adjacent to last processed fragment 420 for vertices that match vertices in the set of frontier vertices. In an embodiment, when a vertex in the set of frontiers matches to a vertex in fragment synopsis 414, FI traversal 314 updates priority 422 of that fragment candidate or if there is no match, inserts the fragment candidate into fragment queue 418, at lines 7-9. In an embodiment, once a vertex in the set of frontiers matches a vertex in fragment synopsis 414, FI traversal 314 marks the vertex in fragment synopsis 414, so that vertex in the associated fragment synopsis 414 may not be matched more than once, as shown in line 6 of pseudo code 600.

Once FI traversal 314 matches fragment synopsis 414 of fragment candidates adjacent to last processed fragment 420, FI traversal 314 iterates through fragment queue 418 and selects a fragment candidate with the highest priority as the next fragment 408 to traverse. In an embodiment, FI traversal 314 appends the selected fragment 408 to execution chain 416.

Figure 7:
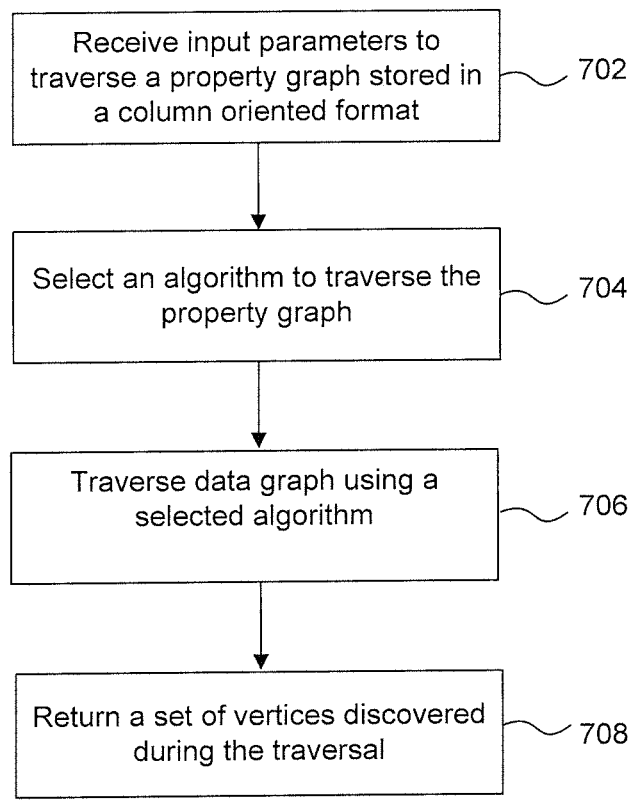
FIG. 7 is a flowchart of a method for traversing a property graph, according to an embodiment.

FIG. 7 is a flowchart 700 of a method for traversing a data graph, according to an embodiment. Method 700 can be performed by processing logic that can comprise hardware (e.g., circuitry, dedicated logic, programmable logic, microcode, etc.), software (e.g., instructions run on a processing device), or a combination thereof. Prior to the traversal, the data graph is stored in a column oriented format in a cache memory of the database management system 102. Example cache memory is discussed in FIG. 10.

At step 702, input parameters of a query are received. For example, GTO may receive a set of start vertices S, edge predicate φ, a collection boundary c, a recursion boundary r, and a traversal direction d that GTO uses to traverse a property graph stored in a column based format.

At step 704, an algorithm for GTO is selected. For example, controller 308 selects an algorithm, such as level-synchronous traversal algorithm 312 or FI algorithm 314 from a set of graph traversal algorithms 310. As part of the selection, controller 308 may query data statistics 312 that include characteristics of the property graph and determine an algorithm based on data statistics 312. In an embodiment, controller 308 may combine data statistics of the property graph with query characteristics to select an algorithm.

At step 706, the data graph is traversed. For example, the GTO uses the input parameters and an algorithm selected in step 704 to traverse the column-based tables of the data graph stored in a memory cache of database management system 102.

At step 708, a set of discovered vertices is returned. For example, GTO returns a set of discovered vertices R to a client device or another process that invoked the GTO.

Figure 8:
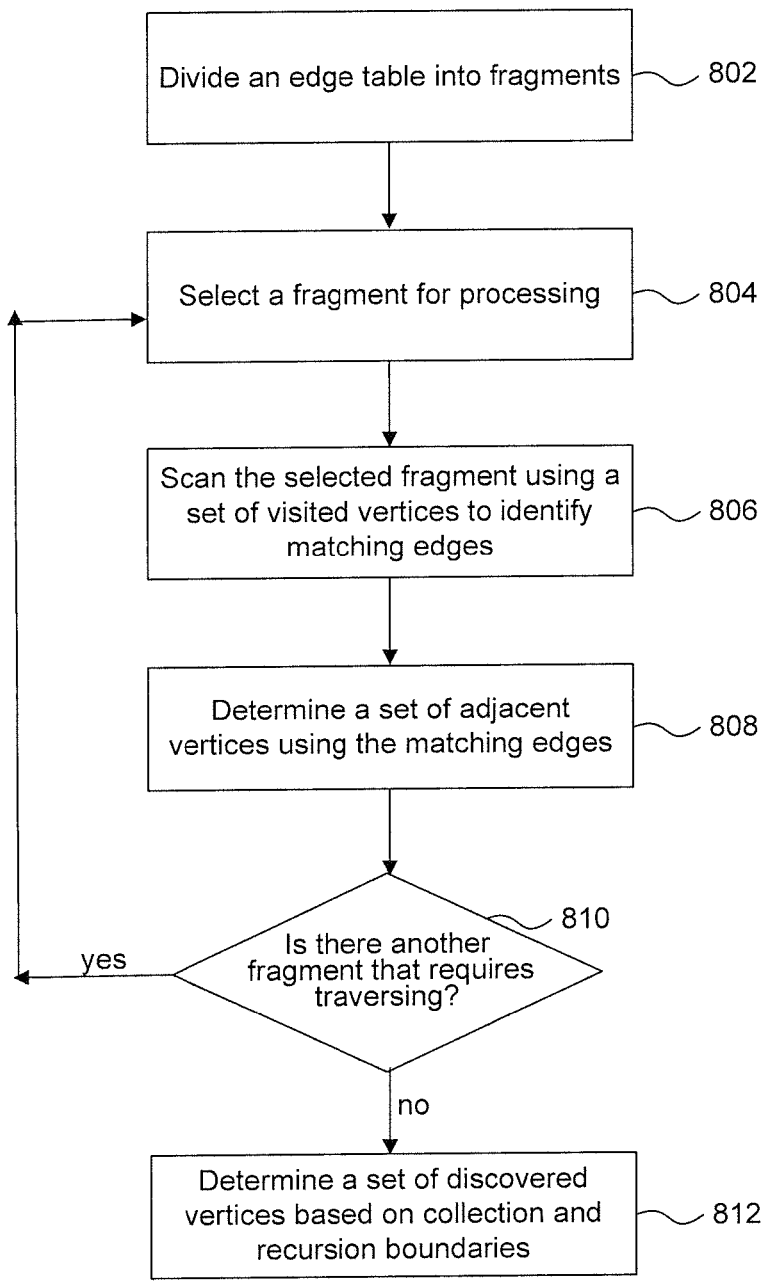
FIG. 8 is a flowchart of a method for traversing a property graph using a fragmented incremental traversal algorithm, according to an embodiment.

FIG. 8 is a flowchart 800 of a method for traversing a property graph using a fragment incremental traversal algorithm, according to an embodiment. Method 800 can be performed by processing logic that can comprise hardware (e.g., circuitry, dedicated logic, programmable logic, microcode, etc.), software (e.g., instructions run on a processing device), or a combination thereof.

At step 802, an edge table is divided into fragments. For example, GTO uses FI traversal 314 to divide source vertex column 404 and target vertex column 406 in edge table 402 of property graph into fragments 408.

At step 804, a fragment is selected for processing. For example, GTO selects fragment 408 for processing.

At step 806, a fragment is scanned. For example, FI traversal 314 scans fragment 408 using a set of visited vertices $D_w$ up to an sFactor number of levels to identify matching edges. In an embodiment, during a first traversal a set of visited vertices $D_w$ may include a set of start vertices S.

At step 808, adjacent vertices are identified. For example, FI traversal 314 uses the matching edges to identify vertices adjacent to the vertices in the set of visited vertices. Once identified, FI traversal 314 includes the adjacent vertices in the set of visited vertices $D_w$.

At step 810, a determination is made whether additional fragments require traversing. For example, FI traversal 314 determines whether additional fragments 408 in edge table 402 require traversing using vertices identified in step 808, also referred to as a set of frontiers. In one instance, FI traversal 314 matches the set of frontiers against a fragment synopsis of adjacent fragment candidates to determine priority 422 of the adjacent fragment candidates. FI traversal 314 then selects one of the adjacent fragments candidates based on priority 422. If FI traversal 314 determines that there is an additional fragment 408 to traverse, the flowchart proceeds to step 804. Otherwise to step 812.

At step 812, a discovered set of vertices is identified. For example, FI traversal 314 uses a collection boundary c and a recursion boundary r to determine a set of discovered vertices R from the set of visited vertices $D_w$.

In an embodiment, to optimize level synchronous algorithm 312 and FI traversal 314, graph engine 116 uses table clustering. In a clustered table, data may be stored in continuous locations in memory, such as one of memories in FIG. 10. FIG. 9 is a block diagram 900 of an example clustered edge table, according to an embodiment. Vertices and edges in a clustered edge table are clustered according to particular attributes. In one example, edge table 902 may be clustered according to a particular edge attribute, such as an edge's Type, where edges of Type="a" are clustered together and edges of Type="b" are also clustered together, in clusters 904a and 904b, respectively. When GTO applies FI traversal 314 to a clustered edge table 902 that is clustered by type and has edge Type="a" as input parameter, FI traversal 314 needs to traverse only fragments 408 that include edges of Type="a". In this case, FI traversal 314 is optimized as GTO accesses continuous chunks of system memory.

In another example, edge table 902 may be clustered according to edges of a source vertex, as shown in cluster 906. In an embodiment, GTO may be optimized if a traversal operation retrieves a set of adjacent vertices of a source vertex in an efficient manner. One way to achieve the efficient access is to introduce topological locality to a property graph. A topological locality in a property graph $G=(V, E)$ describes a concept where accessing all vertices adjacent to a given vertex $v \in V$ is performed in a way that if GTO accesses an adjacent vertex of vertex v, then GTO will likely access most or all other adjacent vertices of v. Because, GTO is likely to access most or all of adjacent vertices, vertices adjacent to vertex v may be written consecutively in system memory, that is discussed in FIG. 10. In an embodiment, adjacent vertices may be written consecutively into system memory, when graph engine 116*b* writes edges sharing the same source vertex consecutively into edge table 902.

In a further embodiment, graph engine 116*b* may combine clustering according to an edge attribute and by edges of a vertex. For example, graph engine 116 may generate edge table 902 where edges are clustered according to a type of an edge as shown in cluster 904*a*, and then according to the edges of a source vertex within cluster 904*a*, as shown in cluster 906.

Figure 10:
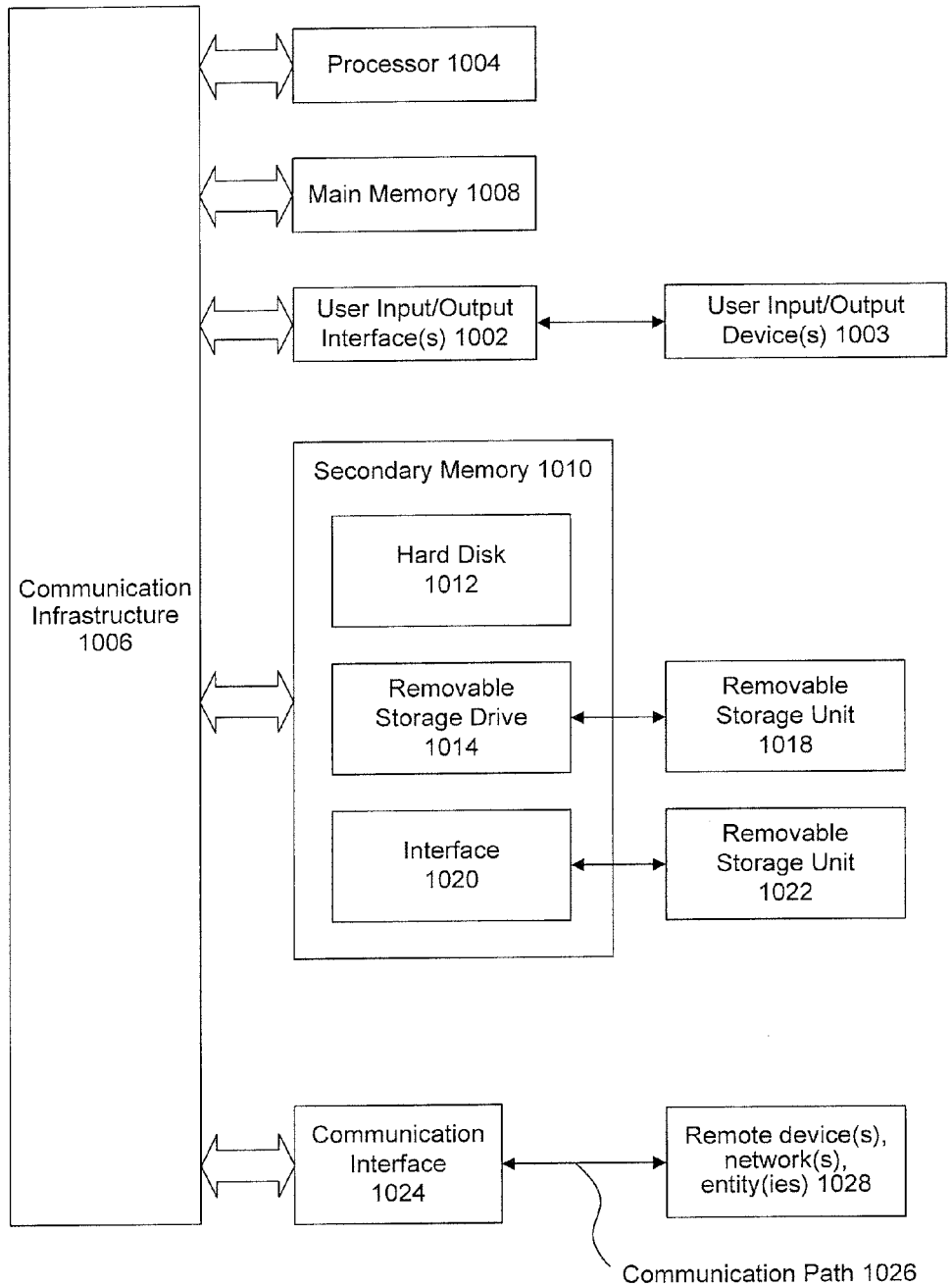
FIG. 10 is an exemplary computing device where the contemplated embodiments can be implemented.

Various embodiments can be implemented, for example, using one or more well-known computer systems, such as computer system 1000 shown in FIG. 10. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for traversing a property graph, comprising:
 receiving a recursion boundary as an input parameter, wherein the recursion boundary defines a maximum number of levels of the property graph for traversal;
 dividing, using a processor, an edge table of the property graph into a plurality of fragments;
 selecting a first fragment for traversing from the plurality of fragments and a set of selected vertices;
 traversing the first fragment using the set of selected vertices, wherein the traversing identifies a set of edges;
 determining a set of adjacent vertices using the set of edges while traversing the first fragment; and
 determining a set of discovered vertices based on the set of selected vertices and the set of adjacent vertices, wherein the set of discovered vertices is constrained based on the recursion boundary.

2. The computer-implemented method of claim 1, wherein the set of selected vertices includes a set of start vertices received as an input parameter.

3. The computer-implemented method of claim 1, further comprising:
 determining a second fragment for traversing based on the set of adjacent vertices determined while traversing the first fragment.

4. The computer implemented method of claim 3, further comprising:
 generating a second set of selected vertices by adding the set of adjacent vertices to the set of selected vertices;
 traversing the second fragment using the second set of selected vertices, wherein the traversing identifies a second set of edges;
 determining a second set of adjacent vertices using the second set of edges; and
 determining the set of discovered vertices based on the second set of selected vertices and the second set of adjacent vertices.

5. The computer-implemented method of claim 3, wherein determining the second fragment further comprises:
 determining a plurality of adjacent fragments, wherein the adjacent fragments are adjacent to the first fragment, and an adjacent fragment is associated with a fragment synopses, wherein the fragment synopsis indicates vertices in the adjacent fragment;
 for each adjacent fragment in the plurality of adjacent fragments:
  matching each vertex in the set of adjacent vertices to each fragment synopses of each adjacent fragment;
  based on the match, incrementing a priority associated with each adjacent fragment; and
 selecting the adjacent fragment associated with a highest priority as the second fragment.

6. The computer-implemented method of claim 1, wherein the property graph is in a column-based format.

7. The computer-implemented method of claim 1, wherein the edge table in the property graph comprises a source vertex column, a target vertex column, and an edge type column, and wherein the edge type column describes a type of edge that connects a first vertex in the source vertex column and a second vertex in the target vertex column.

8. The computer-implemented method of claim 1, further comprising a vertex table, wherein the vertex table includes a vertex identifier for a vertex in the set of selected vertices.

9. The method of claim 1, wherein the receiving comprises:
 receiving the recursion boundary and a collection boundary as input parameters, wherein the wherein the collection boundary specifies a traversal level from which to begin collecting traversal vertices, and wherein the set of discovered vertices is constrained based on the recursion boundary and the collection boundary.

10. A system for traversing a property graph, comprising:
 one or more processors;
 one or more memories coupled to the one or more processors; and
 a graph traversal operator (GTO) stored in the one or more memories and executing on the one or more processors, and configured to:
  receive a recursion boundary as an input parameter, wherein the recursion boundary defines a maximum number of levels of the property graph for traversal;
  divide an edge table of the property graph into a plurality of fragments;
  select a first fragment for traversing from the plurality of fragments and a set of selected vertices;
  traverse the first fragment using the set of selected vertices, wherein the traversing identifies a set of edges;
  determine a set of adjacent vertices using the set of edges while traversing the first fragment; and
  determine a set of discovered vertices based on the set of selected vertices and the set of adjacent vertices, wherein the set of discovered vertices is constrained based on the recursion boundary.

11. The system of claim 10, wherein the set of selected vertices includes a set of start vertices received as an input parameter.

12. The system of claim 10, wherein the GTO is further configured to:
 determine a second fragment for traversing based on the set of adjacent vertices determined while traversing the first fragment.

13. The system of claim 12, wherein the GTO is further configured to:
 generate a second set of selected vertices by adding the set of adjacent vertices to the set of selected vertices;
 traverse the second fragment using the second set of selected vertices, wherein the traversing identifies a second set of edges;
 determine a second set of adjacent vertices using the second set of edges;

determine the set of discovered vertices based on the second set of selected vertices and the second set of adjacent vertices.

14. The system of claim 12, wherein to determine the second fragment the GTO is further configured to:
   determine a plurality of adjacent fragments, wherein the adjacent fragments are adjacent to the first fragment, and an adjacent fragment is associated with a fragment synopses, wherein the fragment synopsis indicates vertices in the adjacent fragment;
   for each adjacent fragment n the plurality of adjacent fragments:
      match each vertex in the set of adjacent vertices to each fragment synopses of each adjacent fragment;
      based on the match, increment a priority associated with each adjacent fragment; and
      select the adjacent fragment associated with a highest priority as the second fragment.

15. The system of claim 10, wherein the property graph is in a column-based format.

16. The system of claim 10, wherein the edge table in the property graph comprises a source vertex column, a target vertex column, and an edge type column, and wherein the edge type column describes a type of edge that connects a first vertex in the source vertex column and a second vertex in the target vertex column.

17. The system of claim 10, further comprising a vertex table stored in the one or more memories, wherein the vertex table includes a vertex identifier for a vertex in the set of selected vertices.

18. The system of claim 10, wherein the GTO is further configured to:
   select a traversal algorithm from a set of traversal algorithms based on cost, wherein the cost includes data statistics on the property graph.

19. The non-transitory computer-readable storage medium having instructions stored thereon, that when executed on one or more processors cause the one or more processors to perform operations, the operations comprising:
   receiving recursion boundary as an input parameter, wherein the recursion boundary defines a maximum number of levels of the property graph for traversal;
   dividing, using a processor, an edge table of the property graph into a plurality of fragments;
   selecting a first fragment for traversing from the plurality of fragments and a set of selected vertices;
   traversing the first fragment using the set of selected vertices, wherein the traversing identifies a set of edges;
   determining a set of adjacent vertices using the set of edges while traversing the first fragment; and
   determining a set of discovered vertices based on the set of selected vertices and the set of adjacent vertices, wherein the set of discovered vertices is constrained based on the recursion boundary.

* * * * *